United States Patent Office 3,185,660
Patented May 25, 1965

3,185,660
STABLE POLYMERIC DISPERSIONS
Lawrence Forwood Beste, Wilmington, Del., assignor to E. I. du Pont de Nemours and Company, Wilmington, Del., a corporation of Delaware
No Drawing. Filed Aug. 15, 1962, Ser. No. 216,991
1 Claim. (Cl. 260—34.2)

This invention relates to the preparation of dispersions from solutions of solid, non-tacky polymers and more particularly to an improved method of preparing dispersions of such polymers having very small particle sizes.

Heretofore polymeric dispersions have been obtained by a variety of techniques which, in nearly all cases, have been accompanied by one or more deficiencies. Thus dispersions of certain polymers have been obtained directly by polymerization, as in the case of aqueous emulsions of vinyl polymers such as polyvinyl acetate or alkyl halide slurries of isoolefin polymers made by so-called Friedel-Crafts catalysis. Many polymers cannot be obtained directly in a dispersed form, however, because of the incompatibility of the desired dispersing medium with the polymerization conditions. For this reason it has been necessary to employ other dispersing techniques. Notable among such alternative methods is that involved in dissolving the polymer in a solvent, followed by precipitation with a non-solvent under conditions of agitation. This method is nevertheless unattractive for commercial purposes because it requires the handling of large volumes of solvents and the costly removal of a part thereof to obtain dispersions having suitably high solids contents. An alternative method, frequently uneconomical because of its slowness, is that of converting bulk polymer into a dispersed form by simply grinding the polymer in the presence of a dispersing medium. Still another method is to dissolve the polymer in a solvent, spray-dry to form particles, and then disperse the particles in a liquid. This technique not only suffers from the disadvantage that large quantities of solvents must be handled but also, even more significantly, from the standpoint that small uniform size particles are not readily afforded. Another method commonly employed is to dissolve the polymer in a mixture of a solvent and a higher boiling non-solvent followed by fractional distillation to remove enough of the solvent so as to precipitate the polymer. This method is attended by problems in maintaining proper agitation in the distillation apparatus, in the relative slowness of the operation, and in the inability to obtain a narrow range of particle sizes. According to another method a heated solution of a polymer in a solvent is gradually cooled to the precipitation temperature, while stirring, but this is accompanied by a wide distribution of particle sizes. A somewhat related process heretofore described involves the isolation of solid polyolefins by spraying a hot polymer solution into a heated chamber held at a somewhat lower temperature and constant reduced pressure, usually subatmospheric. Accordingly large quantities of the solvent, usually 25 to 75%, are flashed off giving a filterable slurry from which the relatively coarse polymer particles are then separated.

An object of the present invention is to provide a means for preparing dispersions of polymers in a volatile solvent. Another object is to provide a means for preparing dispersions of solid polymers not normally obtainable either in a dispersed form or with sufficiently high solids contents. A further object is to provide an improved method for preparing stable fine particle size dispersions of solid polymers; in particular, dispersions of solid, non-tacky polymers having a small average particle size, e.g., within the range of 0.01 to 10 microns, and having a narrow distribution of particle sizes. These and other objects will become apparent in the course of the specification and claims hereinafter.

In the process of this invention, a mixture of a solid polymer and a particular latent solvent for the polymer is subjected in a closed zone to an elevated temperature under superatmospheric pressure to form a solution. The latter is then precipitated by rapid discharge from the zone under shear to lower the temperature, usually the pressure as well, under such conditions as to restrict volatilization of the solvent and thus produce a fine-particle dispersion of the polymer in the solvent.

More particularly, according to the invention stable polymeric dispersions of small particle size are produced by series of steps wherein:

(a) A latent solvent is combined with a non-tacky, normally solid polymer in the weight ratio 1 to 33 parts of polymer per 100 parts of solvent. The latent solvent is an inert liquid having a normal boiling point, $T_{B.P.}$, of 35° C. to 200° C. It is further characterized as being a solvent for at least 1% by weight of the polymer at temperatures above about $T (°C.)_{B.P.} + 40°$ C. but is incapable of dissolving 1% by weight of the polymer at temperatures below about $T (°C.)_{B.P.} + 40°$ C.

(b) Thereafter the polymer is dissolved in the latent solvent in a first closed zone such as a closed reaction vessel at a temperature in the range of $T (°C.)_{Ppt.} + 0.1°$ C. to $T (°C.)_{Ppt.} + 20°$ C. The symbol $T_{Ppt.}$ designates the temperature below which the polymer would precipitate from a solution of at least 1% by weight of the polymer in the latent solvent.

(c) Subsequently the resulting polymer solution is rapidly discharged under shearing forces from the first zone while simultaneously and instantaneously the temperature of the solution is lowered to between $T (°C.)_{B.P.}$ and $T (°C.)_{Ppt.}$ to cause partial volatilization of the latent solvent and effect precipitation of the polymer.

(d) The thusly discharged material is then confined within a second closed zone, again such as a closed reaction vessel, and volatilization of the latent solvent is restricted to no more than 20% by weight until the temperature of the resulting dispersion falls below the $T (°C.)_{B.P.}$ Many advantages are achieved by the foregoing process in comparison with prior art dispersing techniques. Several of the advantages will be described hereinafter, still others will be apparent from the remainder of the specification and the claims.

A notable advantage of the method of the invention is its versatility since polymeric dispersions can be obtained in suitable form from many polymers which before have been difficult, if not impossible, to disperse in certain solvents.

A further advantage of the invention is the production of dispersions having a relatively small average particle size e.g., 0.01 to 10 microns. In most cases they will have a narrow particle size distribution range and will commonly be regarded as being unfilterable. Further, according to the process of the invention the particle size and distribution can be readily controlled.

Of particular importance for many applications, the process of the invention can be employed to yield dispersions containing relatively high percentages of polymer as the dispersed phase.

From the operational standpoint, the process of the invention can be carried out simply with only moderate requirements for apparatus and may be performed either batchwise or continuously. In any case the expensive and sometimes hazardous handling of solvents is greatly minimized.

In one embodiment of the process of the invention, a solid polymer and a latent solvent, both of the character as hereinbefore described, are charged into a pressure zone such as a closed reaction vessel in any polymer: solvent weight ratio up to about 1:3. Larger proportions not only cause an unduly large particle size but also yield a viscosity which is too great for most purposes. The proportion of 1 to 10 parts by weight of polymer per 100 parts by weight of solvent is ordinarily the most satisfactory for both purposes. The mixture is then heated (optionally with agitation) in the pressure zone to a temperature at least 40° C. above the normal (atmospheric pressure) boiling point of the solvent so as to dissolve the polymer. The temperature of the so-obtained liquid solution is adjusted to a value between 0.1 and 20° C. above the $T\ (°C.)_{Ppt.}$, the latter symbol representing the point at which solid polymer would precipitate from the solution. Necessarily the $T\ (°C.)_{Ppt.}$ will be at least about 40° C. above the normal boiling point of the solvent in order to dissolve the requisite amount of polymer.

In essence therefor, the above stage of the process involves the solution of polymer in a latent solvent at superatmospheric pressures, for otherwise heating under normal atmospheric pressure to even the boiling point of the particular latent solvent would not dissolve appreciable amounts of polymer, i.e., 1% by weight or more. Because of these critical requirements for solvency, the phrase "latent solvent" has been adopted. In practice it has been found necessary for the dissolution to attain a minimum temperature of at least 40° C. above the $T\ (°C.)_{B.P.}$ of the latent solvent in order to achieve in the subsequent steps a dispersion of suitable average particle size and particle size distribution. Actually the temperature attained for the dissolution must be at least the $T\ (°C.)_{Ppt.}$ in order to effect solution of the polymer. While it is commonly recognized that the precipitation point for a solute in a solvent may in some circumstances be less than the solution temperature by virtue of supercooling, for the process of this invention the two are virtually identical because of the shearing action associated with precipitation of the solute upon cooling.

Although theoretically the temperature reached in the heating step need only be a fraction of a degree above the $T\ (°C.)_{Ppt.}$, for practical purposes, especially for a commercial process, a few degrees in excess thereof such as up to 20° C. above the $T\ (°C.)_{Ppt.}$ affords a desirable safeguard. In order to minimize unnecessary heating while attaining such a safeguard, heating to a temperature of 1° to 10° above the $T\ (°C.)_{Ppt.}$ will normally be entirely adequate. While in theory temperatures could be employed in excess of $T\ (°C.)_{Ppt.} +20°$ C., assuming the decomposition temperature of the polymer or latent solvent were not reached, in fact such would be inefficient and uneconomical for the reason that excessive external cooling would later be necessary to prevent the volatilization of unduly large amounts of latent solvent.

For the dissolution of the polymer the selection of the necessary heating temperature can be based upon a preliminary experimental determination of the $T\ (°C.)_{Ppt.}$ or upon reference to known solubility curves. While the heating temperature will depend upon the foregoing considerations, it is preferred to employ temperatures below about 350° C. or lower depending upon the point at which the polymer degrades or is otherwise adversely affected. Desirably the $T\ (°C.)_{Ppt.}$ is at least 25° C. below the softening point of the polymer. Since the heating must be conducted at least 40° C. above the $T\ (°C.)_{B.P.}$, the minimum heating temperatures for the lowest boiling latent solvent would be 75° C. The latent solvent, being a volatile liquid, should provide a vapor pressure of at least about 19 pounds per square inch at the temperature of the polymer solution.

The heated solution containing dissolved polymer is then treated to effect the desired precipitation. As will be apparent from the examples, a convenient apparatus for conducting the process of the invention is a pair of superimposed pressure vessels or bombs connected by a line such as pipe of relatively small size which is fitted with a valve. Although particular reference will be made to such an arrangement hereinafter for purposes of explanation it is to be understood that any apparatus capable of achieving the necessary process conditions can be utilized.

The heated polymer solution under pressure in the first closed zone is rapidly discharged under shearing forces from that zone while simultaneously and instantaneously lowering the temperature of the solution to between $T\ (°C.)_{B.P.}$ and $T\ (°C.)_{Ppt.}$ to effect precipitation of the polymer. The rapid flow of the solution under pressure as it exits from the first zone, e.g. one which is positioned above the other, through for example a conduit of restricted opening while lowering the temperature below the $T\ (°C.)_{Ppt.}$ creates an intense shearing turbulent action. The resulting agitation promotes, upon limited evaporation of the solvent, the formation of uniformly small discrete particles rather than large size precipitates or coarse agglomerates. Consequently it will be apparent that no external heat-removing means need be employed to cause precipitation.

With the described apparatus, e.g. two pressure vessels connected by a line of restricted opening, the pressure drop alone resulting from the opening of the valve and the flow of solution will in most cases, depending upon the relative volume of the vessels, be sufficient to cool the discharging solution below the $T\ (°C.)_{Ppt.}$ to effect precipitation. If for example the vessels are approximately equal in volume, a 50% reduction in pressure will result and in all cases this will be accompanied by a lowering of the temperature by at least 20° C., this then being sufficient to be assured that precipitation will occur. When the hot polymer solution is maintained only about 1° C. or less above the $T\ (°C.)_{Ppt.}$, a mere 5% reduction in pressure will assure precipitation. In this regard utilization of the equation:

$$P = 5T^{.75}$$

wherein P is the resulting pressure drop in percent and T is the temperature drop in degrees centigrade affords a convenient means for determining the extent to which the pressure must be lowered to cause precipitation. Thus knowing the numerical difference between temperature of the heated polymer solution and the precipitation temperature, both in degrees centigrade, the requisite lowering in pressure can be calculated.

It is to be understood that the instantaneous lowering of the hot polymer solution, preferably adiabatically, to a temperature between $T\ (°C.)_{B.P.}$ and $T\ (°C.)_{Ppt.}$ need only be for a brief moment to ensure that the polymer is fully accessible to latent solvent as precipitation occurs. If the latent solvent were to be largely flashed off as by discharge into the atmosphere with a rapid lowering of the temperature below the $T\ (°C.)_{B.P.}$, uncontrolled growth of the polymer particles would occur without the formation of a stable fine particle size dispersion. Confinement of the discharged material within a second closed zone, substantially free of extraneous fluids or particulate solids other than polymer and latent solvent, while restricting volatilization of the latent solvent to no more than 20% by weight of that contained in the solution until the temperature falls below the latent solvent $T\ (°C.)_{B.P.}$ ensures the formation of a suitable dispersion. In most cases, depending upon the temperature drop necessary, volatilization will be limited to between 0.5 and 10% by weight.

By this technique controlled volatilization of latent solvent is relied upon to effect precipitation, control particle size and maintain a dispersion of suitable solids content. Once the temperature of the resulting dispersion falls below the $T\ (°C.)_{B.P.}$ of the latent solvent, either by allowing the dispersion to gradually cool ambiently or by external cooling means, the superatmospheric pressure thereon can be released without concern that excessive amounts of solvent will be vaporized. Suitable means for external cooling include conduction, radiation or convection from the walls, liquid mixture or latent solvent vapors.

The exact details of the mechanism by which the unique products result from the process of the invention are not fully known. Indications are, however, that a combination of (1) the sudden or flash vaporization of a small portion of the latent solvent upon release of the polymer solution from the first closed zone or vessel coupled with (2) the exertion upon the solution of a shearing force, as for example by passing through an orifice of restricted opening, creates a large number of bubble nuclei. These nuclei then serve as the foci for virtually instantaneous separation of solid polymer in the form of small particles from the solution which has been cooled below the precipitation temperature by the removal of heat upon evaporation of a portion of the solvent. By confining the discharged material within a second closed zone or vessel such that the fraction of latent solvent vaporized in the process will be less than one-fifth by weight of the total solvent initially present in the solution, the small particles are retained as such in the form of a highly stable dispersion. Unquestionably the flash vaporization of a part of the solvent during the process further assists the polymer precipitation by at least slightly increasing the polymer concentration, in some cases apparently to and beyond the saturation point.

The following illustrate the invention but are not intended to limit it in any respect. Unless otherwise stated parts are by weight.

Example I

A mixture of 1 gram (g.) of linear polyethylene having a melt index of 4.8 and a density of about 0.95 and 100 milliliters (ml.) of methylene chloride is placed in a cylindrical stainless steel pressure vessel having a capacity of 215 ml. The vessel is fitted with a 2 millimeter (mm.) bore Hoke needle valve bearing a "Snap-Tite" coupling through which it is later quickly connected to a second receiving vessel. Solution is effected by tumbling the bomb end-over-end in an air oven maintained at 130° C. The bomb is then connected to a second 215 ml. pressure vessel which is at room temperature and atmospheric pressure, and which has a single opening fitted with a matching "Snap-Tite" coupling. The valve on the solution bomb is then opened so as to discharge the contents to the receiving bomb in less than 2 seconds. The receiving bomb is allowed to air cool, and then to cool in cold water down to room temperature before opening. The receiving bomb is found to contain a dispersion of spherical particles having a diameter of about 10 to 20 microns. This dispersion does not settle on standing at room temperature for 1 day. The storage stability is still further increased by incorporating 0.2% stearylamine therein, and by making smaller particles through flashing at temperatures (i.e., 110–115° C.) near the precipitation temperature. Concentrating the dispersion stabilized with stearylamine by centrifuging gives a solids content of 2.4% by weight.

In a similar experiment, a mixture of 1 g. polyethylene and 100 ml. diethylamine is heated until solution occurs at 140° C., and then blown down into the receiving vessel, to give a stable dispersion.

By the same procedure a mixture of 1 g. polyethylene, 90 ml. n-hexane, and 10 ml. isopropyl alcohol is converted to a solution at 150° C., which is then converted to a dispersion having particles primarily 1–10 microns in diameter. Partial settling of the dispersion is sometimes noted after it has been kept at room temperature for one day.

Example II

A mixture of 20 g. linear polypropylene, having melt index 25, and 100 ml. tertiary amyl alcohol and one drop of soft soap is converted to a solution at 180° C., using the apparatus described in Example I. By the technique described therein, a dispersion containing particles having an average size of 5 microns is then obtained. Addition of about 25% methyl ethyl ketone to the dispersion gives a smoother product. Replacement of the amyl alcohol by a mixture of 3 volumes water and 1 volume methanol as the dispersing liquid is effected by repetitively diluting the amyl alcohol dispersion with methanol and then centrifuging and decanting the supernatant mixture of alcohols, resuspending in methanol, and finally diluting with water.

In a similar fashion, tertiary amyl alcohol dispersions containing as little as 1 (w./v.) percent polypropylene are made; the dispersions containing less than 10% solids partially settle on standing several days, the solids layer being a highly stable concentrated dispersion containing about 10% solids that readily re-disperses upon shaking.

Example III

Using the procedure of Example I, dispersions of poly(hexamethylene adipamide) (relative viscosity 36) are prepared in solvent mixtures consisting of methanol and water in the ratio of 2/1–1/1, at temperatures of 165–180° C., and concentrations of 2–20 g./100 ml. solvent. These dispersions have elongated particles with a width of 0.2–1 micron and a length of 1–3 microns.

These polyamide dispersions are fluid up to about 18% solids. Incorporation of 2.5% aluminum chloride, based on weight of the polymer, in the mixture before flashing gives a dispersion with greatly increased storage stability.

A mixture of 33 g. poly(hexamethylene adipamide) and 100 ml. methanol/water (50/50) gives a paste-like dispersion upon flashing. Conversion of this paste to a fluid dispersion containing 18% solids is effected by thinning with water.

Plasticization of the polyamide particles is achieved by adding a softening agent to the mixture before flashing. Thus, dispersions that give more easily coalesced films are prepared by incorporating 0.5 g. tetrafluoropropanol or dioctyl phthalate into a dispersion prepared from 5 g. of the polyamide, 67 ml. methanol, and 33 ml. water.

Example IV

A 1:1 heat reaction product of poly(hexamethylene adipamide) and abietic acid is converted to a dispersion by dissolving 3.3 g. of the mixture in 100 ml. acetone/water (5/1) at 155° C., using the technique of Example I. A dispersion containing 1–5 micron particles results. Evaporation of most of the acetone from the dispersing fluid by bubbling nitrogen therethrough gives a 12% dispersion of a mixture of the polyamide and abietic acid wax which is still fluid but has a moderate amount of body.

Example V

The approximate temperature at which 5 g. of an interpolyamide, prepared from 20 parts hexamethylenediamine adipate and 80 parts caprolactam, dissolves in 100 g. of a mixture of water and methanol is 175–180° C. for a 60/40 water/methanol mixture, 154° C. for a 55/45 mixture, and 105° C. for a 50/50 mixture.

Using the Example I method, stable dispersions are prepared from 3–24 g. of the interpolyamide in 100 ml. of either a 55/45 or a 60/40 water/methanol mixture at about 180° C. Dispersions containing more than 16% solids are rather pastelike.

Incorporating 2.5% by weight (based on the interpolyamide) of aluminum chloride hexahydrate into the initial solution increases both the storage stability and fluidity of these interpolyamide dispersions. Flowable dispersions containing up to 28% solids are obtained from more dilute dispersions by allowing them to stand at room temperature for several days, decanting from the sludge which contains agglomerates and large particles, and centrifuging the decanted dispersion of fine particles.

The particles in a dispersion prepared from 3 g. of the interpolyamide, 60 ml. water, 40 ml. methanol, and 0.3 g. aluminum chloride hexahydrate at 180° C. have diameters of .03 to 1 micron, the majority being about 0.3 micron, as revealed by electron microscopy.

Example VI

To compare the results obtained by the flashing technique with conventional methods for preparing small polymer particles from solution, a series of experiments is run in which the polymer solution is either cooled down over a 1-hour period within the solution vessel, or expanded into the receiving vessel by the procedure described in Example I. These experiments are carried out with the same interpolyamide used in Example V, and a 60/40 water/methanol mixture. The results are shown in the following table:

| Example | Cooling Time | Polymer Conc. (g./100ml.) | Average Diameter (microns) | Relative Volume of Average Particle |
|---|---|---|---|---|
| A | 1 hour | 0.1 | 1 | 1 |
| B | 1 hour | 1 | 3 | 27 |
| C | 1 hour | 3 | 3 | 27 |
| D | 1 hour | 24 | 6 | 216 |
| E | Flash | 3 | 0.3 | 0.03 |
| F | Flash | 24 | 1 | 1 |

These particle sizes are determined visually with the aid of a microscope having a calibrated eyepiece. By comparing the relative volume of the particles that are obtained in the four experiments carried out using a 1-hour cooling time, it will be observed that the average particle volume is roughly proportional to the initial polymer concentration in the solution. It is also apparent that the particle size obtained by flash precipitation is much smaller than is provided by slow cooling, even at a much lower polyamide concentration.

Example VII

The effect of the proportion of solvent vaporized in the Example I method is indicated by three experiments, each being carried out with an interpolyamide/solvent ratio of 20 g./100 ml. (18% solids). The interpolyamide and solvent were the same as in Example VI. Using the same 215 ml. vessels described in Example I, the runs are made with various solution volumes. The results are shown in the following table:

| Sample | Solution Volume (ml.) | Average Particle Size (Microns) |
|---|---|---|
| 1 | 180 | 8 |
| 2 | 120 | 5 |
| 3 | 60 | 1 |

It is thus seen that the greater the volume of the receiving chamber, relative to the volume of the liquid polymer solution to be flashed thereinto, the smaller the size of the dispersed particles.

Example VIII

A solution of 3 g. of N-methoxymethylated poly(hexamethylene adipamide), containing 6.9% $CH_3O$ (1 $CH_3O$ for every 3.6 amide links), and 100 ml. 50/50 acetone/water is prepared at 160°, and flashed by the Example I method to give a stable fine particle dispersion having a light tan color.

A dispersion is also prepared with 20 g./100 ml. at 170°, but the color and odor indicate decomposition. Operation at 140° to 150° with 3 g. polymer, 50 ml. water, and 50 ml. acetone gives stable dispersions without evidence of decomposition.

Example IX

Poly(ethylene terephthalate) having an inherent viscosity of 0.73 is dissolved in methylene chloride at 150° C. to give solutions containing up to 20% (w./v.) polymer. Fine particle dispersions are obtained from these solutions at 150° C., using the Example I technique. At 190° C., a large proportion of lumps and chunky particles is obtained.

With trichloroethane as the solvent at 175° C., dispersions containing particles with a 1–2 micron diameter are obtained using 2 to 20 g. polymer per 100 ml. trichloroethane. Only those dispersions containing below 7% solids are fluid.

Example X

A dispersion of poly(ethylene bibenzoate), inherent viscosity 0.61, with a predominance of particles below 1 micron in size, but containing a minor proportion of clumps as large as 20 microns in diameter, is prepared by the Example I technique from 5 g. of the polyester in 100 ml. butyrolactone at 300° C.

Example XI

A dispersion is prepared at 180° C. by the method of Example I from a solution of 5 g. of a polyurethane (inherent viscosity 1.17) obtained from piperazine and ethylene bischloroformate dissolved in 100 ml. 2/1 water/methanol containing 0.5 g. aluminum chloride as stabilizer.

Example XII

This experiment is carried out by the Example I procedure with an elastomeric segmented polyurethane prepared from hexamethylene diisocyanate and a 2:1 molar ratio of 1,4-bis(hydroxymethyl)cyclohexane and the polyether of 2-ethyl-2-methyl-1,3-propanediol having a molecular weight of 1980, said polyurethane having an inherent viscosity in meta-cresol of 2.26.

5 g. of the above elastomeric polyurethane and 100 ml. of a 93/7 acetone/water mixture is heated at 160° C. until solution occurs, and then expanded to give a stable dispersion having a 1 micron particle size.

Example XIII

An 85/14/1 ethylene/ethyl acrylate/methacrylic acid terpolymer (e.g.) is converted to a dispersion in methylisobutyl ketone (100 ml.), using the Example I technique at 140° C., to give 1–2 micron particles.

Example XIV

Cotton linters (2 g.) are dissolved in 100 ml. of a 70% aqueous solution of lithium bromide at 170° C. Expanding the solution by the method of Example I gives a dispersion having 0.01 to 0.1 micron size particles.

The latent solvents employed in accordance with this invention can be a single liquid, a mixture of two or more solvents, or a mixture of one or more solvents and one or more normally non-solvents. The mixtures of two or more solvents, or of solvents plus non-solvents may be azeotropes or simple mixtures. When a simple mixture of solvent and non-solvent is used, the non-solvent should have a lower vapor pressure than the solvent component. In any case, they are volatile liquids which dissolve 1% by weight of the polymer or more only at temperatures in excess of T (° C.)$_{B.P.}$ +40° C., do not degrade or otherwise adversely affect the polymer and which deposit solid polymer upon cooling and/or concentrating their solutions.

For readily controlling volatilization in the second pressure zone, the latent solvent should be one which provides a vapor pressure in excess of 19 pounds per square inch at the temperature of the polymer solution. In general, liquids having a normal boiling point above 200° C. ordinarily are not satisfactory as latent solvents because of the excessively high temperatures and pressures required. For this reason it is desirable to select a latent solvent having a normal boiling point below 160° C. Liquids having a normal boiling point below room temperature are not of practical value because of the difficulties in handling the dispersions. Preferably the latent solvents should have a boiling point above 35° C.

The latent solvent selected should have a T (°C.)$_{B.P.}$ below the softening temperature of the polymer when in contact with that solvent, and preferably at least 40° C. below the softening temperature. For crystalline polymers the softening temperature will be below the crystalline melting point, and will approximate the so-called polymer melt temperature (as defined on page 49 of the book, "Preparative Methods of Polymer Chemistry," by Sorenson and Campbell, published in 1961) when the solvent is not appreciably absorbed by solid polymer in contact therewith.

Suitable latent solvents that may be used in practicing this invention include hydrocarbons such as hexane or benzene; chlorinated hydrocarbons such as methylene chloride, trichloroethylene, 1,1,2-trichlorethane, or chlorobenzene; amines such as diethylamine or pyrrolidine; alcohols such as methanol, ethanol, isopropyl alcohol, amyl alcohols, or cyclohexanol; ketones such as acetone, cyclohexanone, or methyl ethyl ketone; water; lactones such as butyrolactone; esters such as ethyl acetate; ethers such as dioxane or diethyl ether; fluorinated compounds such as fluorobenzene or 2,2,3,3-tetrafluoropropane-1-ol; nitriles such as acetonitrile; nitroparaffins; inorganic liquids such as sulfur dioxide, arsenic trichloride, or silicon tetrachloride; or carbon disulfide. It will be apparent to those skilled in the art that the choice of combinations of the above solvents and the previously disclosed polymers will be governed in addition by factors such as their mutual inertness.

It will be noted that the composition of the solvent for dispersions produced in accordance with this invention is for the most part virtually identical to that initially charged to the first zone, this being in contrast to prior art procedures involving removal of a solvent component to effect precipitation in a residual non-solvent.

By the term "dispersion" herein is meant a suspension of solid particles in a suspending liquid, which suspension does not sensibly settle on standing at room temperature for 12 hours. The difference between the density of the dispersing liquid and the particles should be relatively small in order to provide dispersions having long-term storage stability. For most purposes such difference should be less than 0.4 g/cc. The dispersed particles may have a variety of shapes; certain polymer/latent solvent systems provide particles that are substantially smooth spheres, whereas, whereas other particles may have a generally spherical shape and a rough or porous surface. Some systems provide rod-like or ellipsoidal shapes while others provide frazzled particles having a variety of dissimilar shapes. The dispersions produced in accordance with this invention will have an average particle size of less than about 20 microns, in most cases, 10 microns or less.

The process of the invention is applicable to any non-tacky normally solid organic polymer capable of dissolving in the described latent solvent. They may be highly crystalline, substantially amorphous or combinations thereof. Preferred are the synthetic linear thermoplastic materials. Suitable polymers include: the linear or branched polyolefins such as those described on pp. 73 ff. of volume 1 of the Journal of Applied Polymer Science (1959); polymers of vinyl compounds such as vinyl chloride, vinyl acetate, and acrylonitrile; copolymers of olefins or vinyl compounds; acrylic polymers such as poly(ethyl acrylate) or poly(methyl methacrylate); acetal resins such as polyformaldehyde; polyamides such as those described in U.S. Patents 2,071,253 and 2,190,770, interpolyamides such as those derived from caprolactam and hexamethylenediammonium adipate; polyesters such as those disclosed in U.S. Patents 2,465,319, 2,901,466, and 3,018,272; poly(ethylene bibenzoate), poly(hexamethylene oxalate), poly(alpha-hydroxyisobutyrate); copolyesters such as poly(ethylene terephthalate/sebacate); polyesteramides such as those disclosed in U.S. Patent 2,901,466; polyurethanes such as those described in U.S. Patents 2,741,445 and 2,731,446, or elastomeric polyurethanes such as those described in U.S. Patents 2,929,800–4 inclusive and 2,957,852; polycarbonates; non-tacky diene polymers such as polychloroprene, polyisoprene or poly(tetramethylbutadiene); and crystalline waxes such as abietic acid wax or microcrystalline wax.

Various modifying agents may be incorporated into the dispersions, or into the polymer solutions before the flash step. Said additives may be dispersing agents to give dispersions having long-term storage stability, dyes and coloring agents, plasticizers such as those which promote coalescence upon drying of the dispersion, blowing agents, and fillers. As is apparent from the examples the addition of an aluminum halide, for example $AlCl_3$, $AlF_3$, $AlI_3$, to a dispersion in a latent solvent of a synthetic, linear high molecular weight polymer having intralinear nitrogen containing linkages, such as polycarbonamides and polyurethanes, is highly effective in stabilizing such dispersions against setting upon storage and in increasing fluidity of the dispersions. Desirably such salts are employed for this purpose to the extent of about 1.0 to 5.0% by weight based upon the weight of the polymer.

The process of this invention may be carried out as a continuous operation on either a laboratory or commercial scale by jetting hot polymer solution from a single dissolution chamber, or from a plurality of such chambers connected in parallel arrangement, into a receiving chamber maintained at substantially room temperature by cooling, or at any temperature up to the normal boiling point of the solvent, said chamber being closed to the atmosphere, but provided with an outlet for withdrawing polymer dispersions at a rate substantially equal to the feed rate. The level of the dispersion in the receiving chamber should be maintained so as to provide a free space in the chamber. The amount of free space required will depend upon the desired through put rate, and will be a function of the efficiency of temperature control within the receiving chamber. Slow stirring of the dispersion may optionally be used to aid in maintaining a uniform temperature within the receiving chamber. Continuous operation generally gives a more narrow distribution of particle sizes than the batch process.

The dispersions prepared by the process of this invention have been found of value for coatings, as bonding agents, and in the preparation of dry powders. A dispersion of polypropylene in tertiary amyl alcohol may be used to bond polypropylene batts via impregnation of the batts, drying and hot pressing at 5–10° C. below the polypropylene melting point. In a similar fashion, it is possible to bond batts of poly(ethylene terephthalate) fibers. The elastomeric polyurethane dispersions may be used to bond batts of staple fibers such as polyethylene. Removing the solvent from the polypropylene dispersions gives dry agglomerates which may be broken up into 2–100 micron particles by grinding. These dry particles may be used to form a continuous coating on metal objects by fluidizing the granules at temperatures below their sticking point and suspending the metal parts (heated above the polypropylene melting point) in the fluidized bed. Aqueous dispersions may be made from those dispersed in water-miscible organic media by centrifuging to high solids level, dispersing in water containing a surface-active agent, re-centrifuging to a paste, decanting the supernatant, and re-diluting with additional water. Nylon fibers may be made less slippery by coating with a dispersion of an interpolyamide having a lower softening temperature than the nylon, followed by drying for a few minutes at a temperature intermediate to that at which the nylon and interpolyamide soften (e.g., about 170° C. for the interpolyamide of Example V on poly(hexamethylene adipamide) fibers). Other uses for these dispersions will be apparent to those skilled in that art.

Since many different embodiments of the invention may be made without departing from the spirit and scope thereof, it is to be understood that the invention is not to be limited except to the extent defined in the following claim.

What is claimed is:

A polymeric dispersion of improved stability and fluidity comprising a synthetic, linear high molecular weight polymer dispersed in an inert organic liquid, said polymer having recurring intralinear nitrogen containing linkages and being selected from the group consisting of polycarbonamides and polyurethanes, the weight ratio of said polymer to said liquid being 1 to 33:100, said dispersion containing 1.0 to 5.0% of an aluminum halide based on the weight of the polymer in the dispersion.

References Cited by the Examiner
UNITED STATES PATENTS
2,342,387  2/44  Catlin _____ 260—33.8

FOREIGN PATENTS
1,036,463  8/58  Germany.

ALEXANDER H. BRODMERKEL, *Primary Examiner.*